(12) United States Patent
Zu

(10) Patent No.: US 12,517,982 B2
(45) Date of Patent: Jan. 6, 2026

(54) ELECTROCARDIOGRAM DATA CLASSIFICATION METHOD, COMPUTER DEVICE, AND STORAGE MEDIUM

(71) Applicant: BOE TECHNOLOGY GROUP CO., LTD., Beijing (CN)

(72) Inventor: Chunshan Zu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 788 days.

(21) Appl. No.: 17/621,665

(22) PCT Filed: Feb. 25, 2021

(86) PCT No.: PCT/CN2021/077924
§ 371 (c)(1),
(2) Date: Dec. 21, 2021

(87) PCT Pub. No.: WO2021/170043
PCT Pub. Date: Sep. 2, 2021

(65) Prior Publication Data
US 2023/0153391 A1     May 18, 2023

(30) Foreign Application Priority Data
Feb. 26, 2020 (CN) .......................... 202010121385.2

(51) Int. Cl.
*G06F 18/24* (2023.01)
*A61B 5/318* (2021.01)
(Continued)

(52) U.S. Cl.
CPC ............ *G06F 18/241* (2023.01); *A61B 5/318* (2021.01); *A61B 5/347* (2021.01); *A61B 5/349* (2021.01); *G06F 17/16* (2013.01)

(58) Field of Classification Search
CPC ......... G06F 17/16; G06F 18/241; A61B 5/00; A61B 5/318; A61B 5/346; A61B 5/347;
(Continued)

(56) References Cited

U.S. PATENT DOCUMENTS 5,817,027 A    10/1998  Arand et al.
9,949,714 B2    4/2018  Wu et al.
(Continued)

FOREIGN PATENT DOCUMENTS

CN    103815897 B    7/2015
CN    107811626 A    3/2018
(Continued)

OTHER PUBLICATIONS

Xu Lisheng et al., Multi-sensor fusion for wearable heart rate monitoring system, Journal of Harbin Institute of Technology, May 2015, pp. 97-103, vol. 47, No. 5.
(Continued)

*Primary Examiner* — Amanda K Hulbert
(74) *Attorney, Agent, or Firm* — XSENSUS LLP

(57) ABSTRACT

An electrocardiogram data classification method includes: obtaining a plurality of pieces of heartbeat data according to electrocardiogram data; convolving and pooling the plurality of pieces of heartbeat data to obtain a first feature vector; obtaining a second feature vector, the second feature vector representing frequency domain feature data of the plurality of pieces of heartbeat data and time domain feature data of the plurality of pieces of heartbeat data; fusing the first feature vector and the second feature vector to generate a fusion feature vector; and obtaining classification information of the electrocardiogram data according to the fused feature vector.

12 Claims, 11 Drawing Sheets

(51) Int. Cl.
*A61B 5/347* (2021.01)
*A61B 5/349* (2021.01)
*G06F 17/16* (2006.01)
*G06F 18/241* (2023.01)

(58) Field of Classification Search
CPC ........ A61B 5/349; A61B 5/366; G06N 3/045; G06N 3/0464; G06N 3/09
See application file for complete search history.

(56) References Cited

U.S. PATENT DOCUMENTS

| | | |
|---|---|---|
| 2008/0208072 A1 | 8/2008 | Fadem et al. |
| 2012/0238891 A1 | 9/2012 | Sarkar et al. |
| 2017/0032221 A1 | 2/2017 | Wu et al. |
| 2020/0015695 A1 | 1/2020 | Li et al. |
| 2020/0237246 A1 | 7/2020 | Hu et al. |
| 2020/0305799 A1 | 10/2020 | Cao et al. |

FOREIGN PATENT DOCUMENTS

| | | |
|---|---|---|
| CN | 107837082 A | 3/2018 |
| CN | 107981858 A | 5/2018 |
| CN | 108714026 A | 10/2018 |
| CN | 108852347 A | 11/2018 |
| CN | 109480827 A | 3/2019 |
| CN | 110141218 A | 8/2019 |
| CN | 110251119 A | 9/2019 |
| CN | 110269625 A | 9/2019 |
| CN | 110432891 A | 11/2019 |
| CN | 110584654 A | 12/2019 |
| CN | 110664395 A | 1/2020 |
| CN | 110742599 A | 2/2020 |
| CN | 110772268 A | 2/2020 |
| EP | 3363351 A1 | 8/2018 |
| WO | 2006026548 A1 | 3/2006 |

OTHER PUBLICATIONS

Hanliang Liu, Research and Implementation of Common Abnormal ECG Signal Classification Methods for Mobile Platforms, University of Electronic Science and Technology of China, pp. 1-103.
The Research of J Wave Classification Method Based on Multi-Feature Fusion, Taiyuan University of Technology, pp. 1-86.
Yong Xia et al., ECG Quality Assessment Based On Multi-feature Fusion, 2017 13th International Conference on Natural Computation, Fuzzy Systems and Knowledge Discovery (ICNC-FSKD 2017), pp. 672-676, Weihei, China.
The First Office Action of Priority Application No. CN 202010121385.2 issued by the Chinese Patent Office on Jan. 20, 2022.

ELECTROCARDIOGRAM DATA CLASSIFICATION METHOD, COMPUTER DEVICE, AND STORAGE MEDIUM

CROSS-REFERENCE TO RELATED APPLICATIONS

This application is a national phase entry under 35 USC 371 of International Patent Application No. PCT/CN2021/077924 filed on Feb. 25, 2021, which claims priority to Chinese Patent Application No. 202010121385.2, filed on Feb. 26, 2020, which are incorporated herein by reference in their entirety.

TECHNICAL FIELD

The present disclosure relates to the field of medical information technologies, and in particular, to an electrocardiogram data classification method, a computer device and a storage medium.

BACKGROUND

With the development of social economy, people's lifestyles have undergone profound changes. With an acceleration of the process of population aging and urbanization, a prevalence of cardiovascular diseases is showing a significant upward trend. The number of patients with the cardiovascular diseases is continuously increasing, and prevention and treatment of heart diseases have always been research hotspots.

SUMMARY

In an aspect, an electrocardiogram data classification method is provided. The electrocardiogram data classification method includes: obtaining a plurality of pieces of heartbeat data according to electrocardiogram data; convolving and pooling the plurality of pieces of heartbeat data to obtain a first feature vector; obtaining a second feature vector, the second feature vector representing frequency domain feature data of the plurality of pieces of heartbeat data and time domain feature data of the plurality of pieces of heartbeat data; fusing the first feature vector and the second feature vector to generate a fusion feature vector; and obtaining classification information of the electrocardiogram data according to the fusion feature vector.

In some embodiments, the electrocardiogram data classification method further includes processing input data according to a preset condition. The input data is the plurality of pieces of heartbeat data, or the plurality of pieces of heartbeat data after convolution, or the plurality of pieces of heartbeat data after pooling. The preset condition includes:

$$y_i = \frac{1}{C(x_i)} \sum_{\forall j} [f(x_i, x_j) g(x_j)], \ g(x_j) = W_g x_j,$$

$$f(x_i, x_j) = e^{(W_\theta x_i)^T (W_\phi x_j)}, \text{ and } C(x_i) = \sum_{\forall j} f(x_i, x_j);$$

x is the input data, y is output data corresponding to x, i is a location index of the output data, j is a location index of the input data, value ranges of i and j are both [1, M], and M is a data length; $y_i$ is output data at a location i, $x_i$ is input data corresponding to the output data at the location i, and $x_j$ is input data at a location j; $W_g$ is a first weight matrix, $W_\theta$ is a second weight matrix, and $W_\phi$ is a third weight matrix; $g(x_j)$ is a representation of the input data at the location j; $f(x_i, x_j)$ maps an association relationship between $x_i$ and $x_j$; and $C(x_i)$ is a normalization factor.

In some embodiments, obtaining the second feature vector includes: performing a frequency domain transformation on the plurality of pieces of heartbeat data to obtain the frequency domain feature data of the plurality of pieces of heartbeat data; obtaining the time domain feature data of the plurality of pieces of heartbeat data; and obtaining the second feature vector according to the time domain feature data of the plurality of pieces of heartbeat data and the frequency domain feature data of the plurality of pieces of heartbeat data.

In some embodiments, obtaining the second feature vector according to the time domain feature data of the plurality of pieces of heartbeat data and the frequency domain feature data of the plurality of pieces of heartbeat data includes: generating a first vector according to the time domain feature data of the plurality of pieces of heartbeat data; generating a second vector according to the frequency domain feature data of the plurality of pieces of heartbeat data; and fusing the first vector and the second vector to generate the second feature vector.

In some embodiments, fusing the first feature vector and the second feature vector to generate the fusion feature vector includes: fusing the first feature vector and the second feature vector using $F_f = [(W_{EL} F_E) \times F_L, (W_{LE} F_L) \times F_E]$ to generate the fusion feature vector. $F_L$ is the first feature vector, $F_E$ is the second feature vector, $F_f$ is the fusion feature vector, $W_{EL}$ is a fourth weight matrix, and $W_{LE}$ is a fifth weight matrix.

In some embodiments, obtaining the plurality of pieces of heartbeat data according to the electrocardiogram data includes: acquiring the electrocardiogram data; filtering the electrocardiogram data; detecting locations of a center point, and starting and ending points of a piece of heartbeat data; and extracting a plurality of pieces of continuous heartbeat data from the electrocardiogram data according to the locations of the center point, and the starting and ending points, and the plurality of pieces of continuous heartbeat data including the heartbeat data where the center point is located and serving as the plurality of pieces of heartbeat data.

In another aspect, an electrocardiogram data classification system is provided. The electrocardiogram data classification system includes a first obtaining module, a network module, a second obtaining module, a fusion module, and a classification module. The first obtaining module is configured to obtain a plurality of pieces of heartbeat data according to electrocardiogram data. The network module is connected to the first obtaining module, and the network module is configured to convolve and pool the plurality of pieces of heartbeat data to obtain a first feature vector. The second obtaining module is configured to obtain a second feature vector, and the second feature vector represents frequency domain feature data of the plurality of pieces of heartbeat data and time domain feature data of the plurality of pieces of heartbeat data. The fusion module is connected to both the network module and the second obtaining module, and configured to fuse the first feature vector and the second feature vector to generate a fusion feature vector. The classification module is connected to the fusion module and configured to obtain classification information of the electrocardiogram data according to the fusion feature vector.

In some embodiments, the network module includes a convolutional layer and a pooling layer.

In some embodiments, the network module further includes a global information obtaining layer configured to process input data according to a preset condition. The preset condition includes:

$$y_i = \frac{1}{C(x_i)} \sum_{\forall j} [f(x_i, x_j) g(x_j)], \ g(x_j) = W_g x_j,$$

$$f(x_i, x_j) = e^{(W_\theta x_i)^T (W_\phi x_j)}, \text{ and } C(x_i) = \sum_{\forall j} f(x_i, x_j);$$

x is the input data, y is output data corresponding to x, i is a location index of the output data, j is a location index of the input data, value ranges of i and j are both [1, M], and M is a data length; $y_i$ is output data at a location i, $x_i$ is input data corresponding to the output data at the location i, and $x_j$ is input data at a location j; $W_g$ is a first weight matrix, $W_\theta$ is a second weight matrix, and $W_\phi$ is a third weight matrix; $g(x_j)$ is a representation of the input data at the location j; $f(x_i, x_j)$ maps an association relationship between $x_i$ and $x_j$; and $C(x_i)$ is a normalization factor. In a case where the global information obtaining layer is located before the convolutional layer and connected to the convolutional layer, the input data is the plurality of pieces of heartbeat data; in a case where the global information obtaining layer is located between the convolutional layer and the pooling layer and connected to both the convolutional layer and the pooling layer, the input data is the plurality of pieces of heartbeat data after convolution; and in a case where the global information obtaining layer is located after the pooling layer and connected to the pooling layer, the input data is the plurality of pieces of heartbeat data after pooling.

In some embodiments, the second obtaining module is connected to the first obtaining module, and the second obtaining module is configured to: perform a frequency domain transformation on the plurality of pieces of heartbeat data to obtain the frequency domain feature data; obtain the time domain feature data of the plurality of pieces of heartbeat data; and obtain the second feature vector according to the time domain feature data of the plurality of pieces of heartbeat data and the frequency domain feature data of the plurality of pieces of heartbeat data.

In some embodiments, the second obtaining module includes a vector generation module and a vector fusion module. The vector generation module is configured to: generate a first vector according to the time domain feature data of the plurality of pieces of heartbeat data; and generate a second vector according to the frequency domain feature data of the plurality of pieces of heartbeat data. The vector fusion module is configured to fuse the first vector and the second vector to generate the second feature vector.

In some embodiments, the fusion module is configured to fuse the first feature vector and the second feature vector using $F_f = [(W_{EL} F_E) \times F_L, (W_{LE} F_L) \times F_E]$ to generate the fusion feature vector; and $F_L$ is the first feature vector, $F_E$ is the second feature vector, $F_f$ is the fusion feature vector, $W_{EL}$ is a fourth weight matrix, and $W_{LE}$ is a fifth weight matrix.

In some embodiments, the first obtaining module further includes: an acquisition module configured to acquire the electrocardiogram data; a processing module connected to the acquisition module, the processing module being configured to filter the electrocardiogram data and detect locations of a center point, and starting and ending points of a piece of heartbeat data; and an extraction module connected to the processing module, the extraction module being configured to extract a plurality of pieces of continuous heartbeat data from the electrocardiogram data according to the locations of the center point, and the starting and ending points, the plurality of pieces of continuous heartbeat data including the heartbeat data where the center point is located.

In yet another aspect, a computer device is provided, including a memory and a processor. The memory has stored thereon a computer program that is executable on the processor, and when the processor executes the computer program, an electrocardiogram data classification method is implemented. The electrocardiogram data classification method includes: obtaining a plurality of pieces of heartbeat data according to electrocardiogram data; convolving and pooling the plurality of pieces of heartbeat data to obtain a first feature vector; obtaining a second feature vector, the second feature vector representing frequency domain feature data of the plurality of pieces of heartbeat data and time domain feature data of the plurality of pieces of heartbeat data; fusing the first feature vector and the second feature vector to generate a fusion feature vector; and obtaining classification information of the electrocardiogram data according to the fusion feature vector.

In some embodiments, the electrocardiogram data classification method further includes processing input data according to a preset condition. The input data is the plurality of pieces of heartbeat data, or the plurality of pieces of heartbeat data after convolution, or the plurality of pieces of heartbeat data after pooling. The preset condition includes:

$$y_i = \frac{1}{C(x_i)} \sum_{\forall j} [f(x_i, x_j) g(x_j)], \ g(x_j) = W_g x_j,$$

$$f(x_i, x_j) = e^{(W_\theta x_i)^T (W_\phi x_j)}, \text{ and } C(x_i) = \sum_{\forall j} f(x_i, x_j);$$

x is the input data, y is output data corresponding to x, i is a location index of the output data, j is a location index of the input data, value ranges of i and j are both [1, M], and M is a data length; $y_i$ is output data at a location i, $x_i$ is input data corresponding to the output data at the location i, and $x_j$ is input data at a location j; $W_g$ is a first weight matrix, $W_\theta$ is a second weight matrix, and $W_\phi$ is a third weight matrix; $g(x_j)$ is a representation of the input data at the location j; $f(x_i, x_j)$ maps an association relationship between $x_i$ and $x_j$; and $C(x_i)$ is a normalization factor.

In some embodiments, obtaining the second feature vector includes: performing a frequency domain transformation on the plurality of pieces of heartbeat data to obtain the frequency domain feature data of the plurality of pieces of heartbeat data; obtaining the time domain feature data of the plurality of pieces of heartbeat data; and obtaining the second feature vector according to the time domain feature data of the plurality of pieces of heartbeat data and the frequency domain feature data of the plurality of pieces of heartbeat data.

In some embodiments, obtaining the second feature vector according to the time domain feature data of the plurality of pieces of heartbeat data and the frequency domain feature data of the plurality of pieces of heartbeat data includes: generating a first vector according to the time domain feature data of the plurality of pieces of heartbeat data; generating a second vector according to the frequency domain feature data of the plurality of pieces of heartbeat data; and fusing the first vector and the second vector to generate the second feature vector.

In some embodiments, fusing the first feature vector and the second feature vector to generate the fusion feature vector includes: fusing the first feature vector and the second feature vector using $F_f=[(W_{EL}F_E) \times F_L, (W_{LE}F_L) \times F_E]$ to generate the fusion feature vector. $F_L$ is the first feature vector, $F_E$ is the second feature vector, $F_f$ is the fusion feature vector, $W_{EL}$ is a fourth weight matrix, and $W_{LE}$ is a fifth weight matrix.

In some embodiments, obtaining the plurality of pieces of heartbeat data according to the electrocardiogram data includes: acquiring the electrocardiogram data; filtering the electrocardiogram data; detecting locations of a center point, and starting and ending points of a piece of heartbeat data; and extracting a plurality of pieces of continuous heartbeat data from the electrocardiogram data according to the locations of the center point, and the starting and ending points, the plurality of pieces of continuous heartbeat data including the heartbeat data where the center point is located and serving as the plurality of pieces of heartbeat data.

In yet another aspect, a non-transitory computer-readable storage medium is provided, having stored a computer program thereon. When the computer program is executed by a processor, the electrocardiogram data classification method as described in any one of the above embodiments is implemented.

In yet another aspect, a computer program product is provided. The computer program product includes computer program instructions. When executed on a computer, the computer program instructions cause the computer to perform one or more steps in the electrocardiogram data classification method as described in any one of the above embodiments.

In yet another aspect, a computer program is provided. When executed on a computer, the computer program causes the computer to perform one or more steps in the electrocardiogram data classification method as described in any one of the above embodiments.

BRIEF DESCRIPTION OF THE DRAWINGS

In order to describe technical solutions in embodiments of the present disclosure more clearly, the accompanying drawings to be used in the description of the embodiments will be introduced briefly. Obviously, the accompanying drawings to be described below are merely some embodiments of the present disclosure, and a person of ordinary skill in the art can obtain other drawings according to these drawings without paying any creative effort. In addition, the accompanying drawings to be described below may be regarded as schematic diagrams, and are not limitations on an actual size of a product, an actual process of a method and an actual timing of a signal involved in the embodiments of the present disclosure.

DETAILED DESCRIPTION

Figure 1:
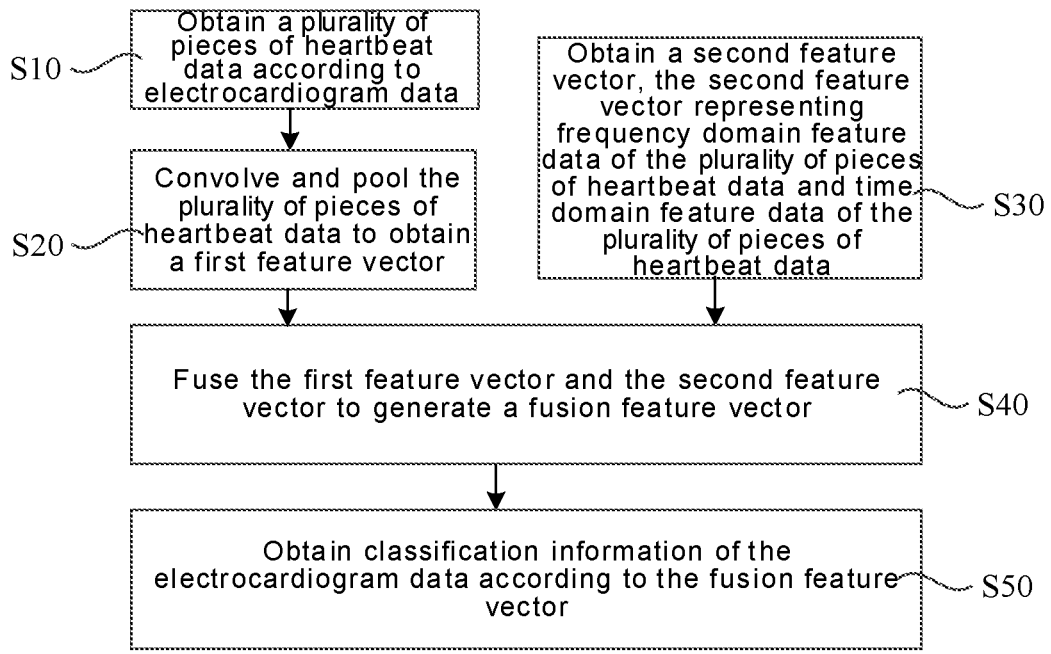
FIG. 1 is a flow diagram of an electrocardiogram data classification method, in accordance with some embodiments.

The technical solutions in the embodiments of the present disclosure will be described below clearly and completely with reference to the accompanying drawings in the embodiments of the present disclosure. Obviously, the described embodiments are merely some but not all of embodiments of the present disclosure. All other embodiments obtained based on the embodiments of the present disclosure by a person of ordinary skill in the art without paying any creative effort shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of/the plurality of/multiple" means two or more unless otherwise specified.

In the description of some embodiments, the term "connected" and its derivatives may be used. For example, the term "connected" may be used in the description of some embodiments to indicate that two or more components are in direct physical or electrical contact with each other.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

In addition, the use of the phase "based on" means openness and inclusiveness, since a process, step, calculation or other action that is "based on" one or more of the stated conditions or values may, in practice, be based on additional conditions or values exceeding those stated.

Electrocardiogram data is of great importance in research of clinical medicine. The electrocardiogram data can comprehensively reflect a moving process of the heart, and is readily observable, so it plays an important role in the detection and diagnosis of heart diseases. Since most heart diseases are generally reflected in a certain heartbeat in a long period of time and are hard to be found, an improvement in an automatic detection and classification method of the electrocardiogram data is of great significance for providing an auxiliary treatment for doctors.

Some embodiments of the present disclosure provide an electrocardiogram data classification method. As shown in FIG. 1, the method includes steps 10 to 50 (S10 to In S10, a plurality of pieces of heartbeat data are obtained according to electrocardiogram data.

Before cardiac mechanical contraction, cardiac muscle first produces electrical activation. This current can be conducted to body surface through tissues and body fluids, and forms a potential difference on surfaces of different parts of the body. This variable potential difference is recorded using an electrocardiograph, so as to form an electrocardiogram (ECG). What the ECG records is the electrocardiogram data.

Figure 2A:
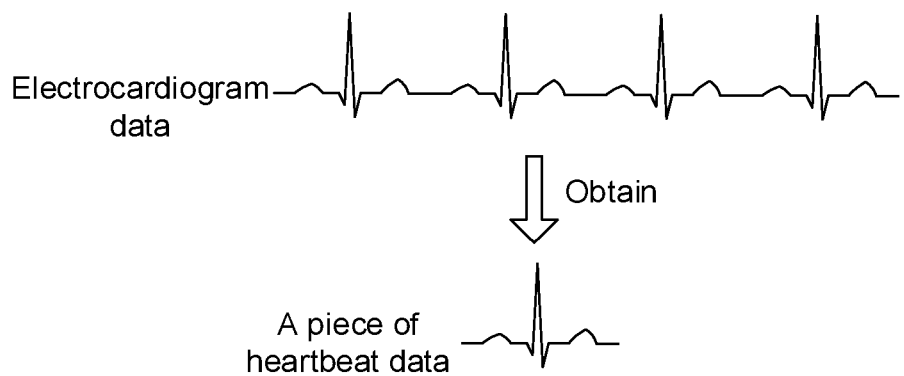
FIG. 2A is a waveform diagram of electrocardiogram data, in accordance with some embodiments.

As shown in FIG. 2A, the electrocardiogram data includes a series of pieces of heartbeat data, i.e., including a plurality of pieces of continuous heartbeat data. Each piece of heartbeat data refers to electrocardiogram data generated when the heart beats once.

Figure 2B:
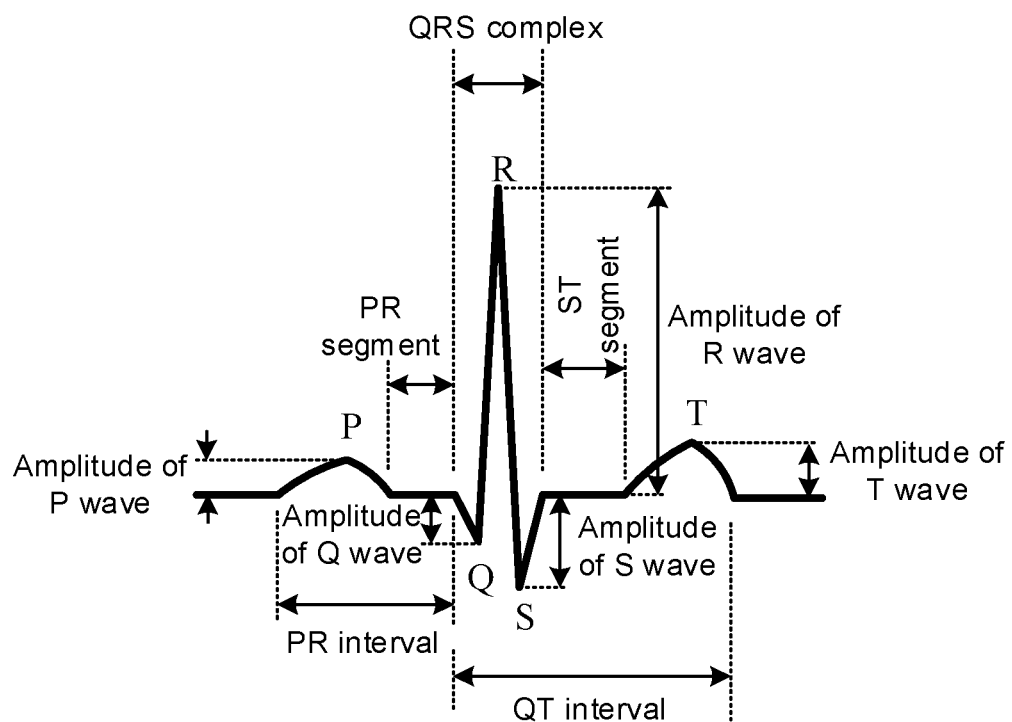
FIG. 2B is a waveform diagram of a single piece of heartbeat data, in accordance with some embodiments.

For example, as shown in FIG. 2B, each piece of heartbeat data may include:
  P wave, reflecting a potential shift in a process of depolarization of atrial muscle;
  PR interval, representing a time period from the onset of the depolarization of the atrial muscle to the onset of depolarization of ventricular muscle;
  QRS complex, reflecting a potential change in a process of the depolarization of the ventricular muscle; usually, the QRS complex being the combination of three closely connected waves, that is, a first downward wave being a Q wave, an upward high wave after the Q wave being an R wave, and a downward wave after the R wave being an S wave; and "QRS complex" being a depolarization wave representing the ventricular muscle in a broad sense, and not every QRS complex having Q, R, and S waves;
  ST segment, referring to a flat line after the QRS complex and before a T wave, and representing a period of time from the end of depolarization of left and right ventricles to the onset of repolarization;
  T wave, representing total time from the onset of the depolarization to the end of repolarization of the ventricular muscle; and
  QT interval, representing total time from the onset of the depolarization to the end of repolarization of entire ventricular muscle.

Based on this, for example, each piece of heartbeat data may further include a small wave after the T wave, which is referred to as a U wave.

Each band in the heartbeat data represents certain medical significance. If the heart is diseased, some distortion in a waveform pattern of the heartbeat data may occur.

Based on this, for example, an appropriate duration of time (e.g., 1 second) may be selected, or the plurality of pieces of heartbeat data may be obtained from the electrocardiogram data according to locations of the S wave and the T wave, so as to classify the electrocardiogram data.

In S20, the plurality of pieces of heartbeat data are convolved and pooled to obtain a first feature vector.

It will be noted that in some embodiments of the present disclosure, a method of convolving and pooling the plurality of pieces of heartbeat data to obtain the first feature vector is based on a convolutional neural network.

For ease of understanding of the technical solutions of the present disclosure, a basic principle of the convolutional neural network is introduced first.

The convolutional neural network is a supervised learning method in deep learning, and is a multi-level network connection mechanism that simulates a neural network. Input data passes through each layer in sequence, and undergoes a series of complex data processing in layers, such as convolution, pooling, regularization, overfitting prevention, dropout, and activation. Generally, Relu activation function is used to automatically abstract some features of the input data layer by layer, and then these features are passed as input to a high layer for calculation. For example, the convolutional neural network includes LeNet, AlexNet, VGG, NiN, GooLeNet, ResNet, and other types of networks.

In some embodiments of the present disclosure, the plurality of pieces of heartbeat data (e.g., the plurality of pieces of continuous heartbeat data) are input into the convolutional neural network for convolution and pooling, and a corresponding output result is taken as the first feature vector. The first feature vector may be obtained using the convolutional neural network. The first feature vector may effectively reflect implicit medical information.

It will be noted that when the plurality of pieces of heartbeat data are input into the convolutional neural network, the convolution and the pooling may be performed multiple times according to needs, and the numbers of the convolution and the pooling are not limited in embodiments of the present disclosure.

In some embodiments, the electrocardiogram data classification method may further include processing the input data according to a preset condition.

The preset condition includes:

$$y_i = \frac{1}{C(x_i)} \sum_{\forall j} [f(x_i, x_j) g(x_j)], \; g(x_j) = W_g x_j,$$

$$f(x_i, x_j) = e^{(W_\theta x_i)^T (W_\phi x_j)}, \text{ and } C(x_i) = \sum_{\forall j} f(x_i, x_j);$$

x is the input data, y is output data corresponding to x, i is a location index of the output data, j is a location index of the input data, value ranges of i and j are both [1, M], and M is a data length; $y_i$ is output data at a location i, $x_i$ is input data corresponding to the output data at the location i, and $x_j$ is input data at a location j; and $W_g$ is a first weight matrix, $W_\theta$ is a second weight matrix, and $W_\phi$ is a third weight matrix.

A pairwise function $g(x_i,x_j)$ is used to map an association relationship between $x_i$ and all $x_j$, a function of one variable $g(x_j)$ is used to calculate a representation of the input data at the location j, and a function $C(x_i)$ is a normalization factor.

A step of processing the input data according to the preset condition may be performed before steps of convolving and pooling the plurality of pieces of heartbeat data. In this case, the input data may be the plurality of pieces of heartbeat data, the output data is obtained after the input data is processed according to the preset condition, and the first feature vector may be obtained after the output data is convolved and pooled. Alternatively, the step of processing the input data according to the preset condition may be performed after the plurality of pieces of heartbeat data are convolved. In this case, the input data may be the plurality of pieces of heartbeat data after the convolution, the output data is obtained after the input data is processed according to the preset condition, and the first feature vector may be obtained after the output data is pooled. Alternatively, the step of processing the input data according to the preset condition may be performed after the convolution and the pooling of the plurality of pieces of heartbeat data. In this case, the input data may be the plurality of pieces of heartbeat data after the pooling, the output data is obtained after the input data is processed according to the preset condition, and the output data may be the first feature vector.

It will also be noted that values of the first weight matrix, the second weight matrix, and the third weight matrix may be set according to needs, which are not limited in embodiments of the present disclosure.

In the electrocardiogram data classification method provided by some embodiments of the present disclosure, the step of processing the input data according to the preset condition can allow data at any location in the input data to correlate with all data within a certain data length where the data is located.

In this way, before the steps of convolving and pooling the plurality of pieces of heartbeat data are performed, the input data is processed according to the preset condition, that is, the plurality of pieces of heartbeat data are processed according to the preset condition, which may enhance a relevance among the plurality of pieces of heartbeat data, thereby reducing the numbers of the convolution and the pooling required when the plurality of pieces of heartbeat data are convolved and pooled. In addition, since the plurality of pieces of heartbeat data have a strong relevance after being processed, an accuracy and a reliability of the obtained first feature vector are relatively high after the plurality of pieces of processed heartbeat data are convolved and pooled.

In addition, after the convolution and the pooling of the plurality of pieces of heartbeat data, an amount of the output data will be accordingly reduced compared to an amount of the input data. Therefore, it is also possible to process the plurality of pieces of heartbeat data that have been convolved and pooled according to the preset condition after the steps of convolving and pooling the plurality of pieces of heartbeat data, which may avoids a problem of high complexity and difficulty of the processing process due to too much data.

When there is a need to convolve and pool the plurality of pieces of heartbeat data multiple times, the plurality of pieces of heartbeat data that have been convoluted and pooled may also be processed according to the preset condition between multiple convolutions and poolings. In this way, not only can the problem of high complexity and difficulty of the processing process due to too much data be avoided, but also the accuracy and reliability of the first feature vector can be improved to be relatively high.

In S30, a second feature vector is obtained, and the second feature vector represents frequency domain feature data of the plurality of pieces of heartbeat data and time domain feature data of the plurality of pieces of heartbeat data.

The time domain feature data of the plurality of pieces of heartbeat data includes an interval, an interval ratio, an interval mean, an amplitude, and a width of a total of N pieces of heartbeat data before and after a current heartbeat data.

The interval refers to a time difference between two adjacent R waves; the interval ratio refers to a ratio of two adjacent intervals; the interval mean refers to an average of a plurality of intervals; the amplitude refers to an amplitude of a QRS wave, and may also be an amplitude of an individual Q wave, R wave, S wave or other combinations; and the width refers to a width of the QRS wave, and may also be a width of an individual Q wave, R wave, S wave or other combinations.

For example, if a total number of the plurality of pieces of heartbeat data including the current heartbeat data is 11, there are 11 R waves, and accordingly, there are 10 intervals, and an average of the 10 intervals is calculated as the interval mean.

It will be noted that the frequency domain feature data and the time domain feature data are complementary feature data.

The second feature vector can represent the frequency domain feature data of the plurality of pieces of heartbeat data and the time domain feature data of the plurality of pieces of heartbeat data. In this case, the second feature vector can reflect explicit medical features of the plurality of pieces of heartbeat data.

In S40, the first feature vector and the second feature vector are fused to generate a fusion feature vector.

For example, the above S40 includes:

fusing the first feature vector and the second feature vector using $F_f=[(W_{EL}F_E)\times F_L,(W_{LE}F_L)\times F_E]$ to generate the fusion feature vector; $F_L$ being the first feature vector, $F_E$ being the second feature vector, $F_f$ being the fusion feature vector, $W_{EL}$ being a fourth weight matrix, and $W_{LE}$ being a fifth weight matrix.

It will be noted that a first coefficient $C_L$ is obtained using $C_L=W_{EL}F_E$ according to the second feature vector $F_E$ and the fourth weight $W_{EL}$; and then, the first coefficient $C_L$ acts on the first feature vector $F_L$ to obtain a first sub-fusion feature vector $F_{LT}=(W_{EL}F_E)\times F_L$.

A second coefficient $C_E$ is obtained using $C_E=W_{LE}F_L$ according to the first feature vector $F_L$ and the fifth weight matrix $W_{LE}$; and then, the second coefficient acts on the second feature vector $F_E$ to obtain a second sub-fusion feature vector $F_{ET}=(W_{LE}F_L)\times F_E$. Then, the first sub-fusion feature vector and the second sub-fusion feature vector are used to generate the fusion feature vector $F_f$ by ways of splicing and summation.

Values of the fourth weight matrix and the fifth weight matrix herein may be set according to needs, which are not limited in embodiments of the present disclosure.

Since the fusion feature vector is generated by the fusion of the first feature vector and the second feature vector, the fusion feature vector can reflect both the explicit medical information and the implicit medical information, so that when the fusion feature vector is used to obtain classification information of the electrocardiogram data, a classification accuracy can be improved, and a generalization ability can also be improved.

In S50, the classification information of the electrocardiogram data is obtained according to the fusion feature vector. The classification information of the electrocardiogram data includes, for example, sinus beat, ventricular beat, supraventricular beat, pacing beat, and other types of information.

For example, according to the fusion feature vector, a support vector machine (SVM) or a multilayer perceptron (MLP) may be used and a machine learning method may be adopted to obtain the classification information of the electrocardiogram data.

It will also be noted that before the multilayer perceptron is used to classify the fusion feature vector, the multilayer perceptron needs to be trained. A weight and a bias in the multilayer perceptron are changed, so that the multilayer perceptron achieves a high accuracy in use.

In the electrocardiogram data classification method provided by some embodiments of the present disclosure, the plurality of pieces of heartbeat data may be obtained according to the electrocardiogram data, and the plurality of pieces of heartbeat data are convolved and pooled to obtain the first feature vector; and the second feature vector may be obtained, and the second feature vector represents the frequency domain feature data of the plurality of pieces of heartbeat data and the time domain feature data of the plurality of pieces of heartbeat data. Then, the first feature vector and the obtained second feature vector are fused to generate the fusion feature vector; and the classification information of the electrocardiogram data is obtained according to the fusion feature vector. Since the fusion feature vector fuses the first feature vector and the second feature vector, the fusion feature vector can not only reflect the implicit medical information reflected by the first feature vector, but also reflect the explicit medical information reflected by the second feature vector. Therefore, the accuracy of the classification of the electrocardiogram data is improved when the fusion feature vector is subsequently used to obtain the classification information.

Figure 3:
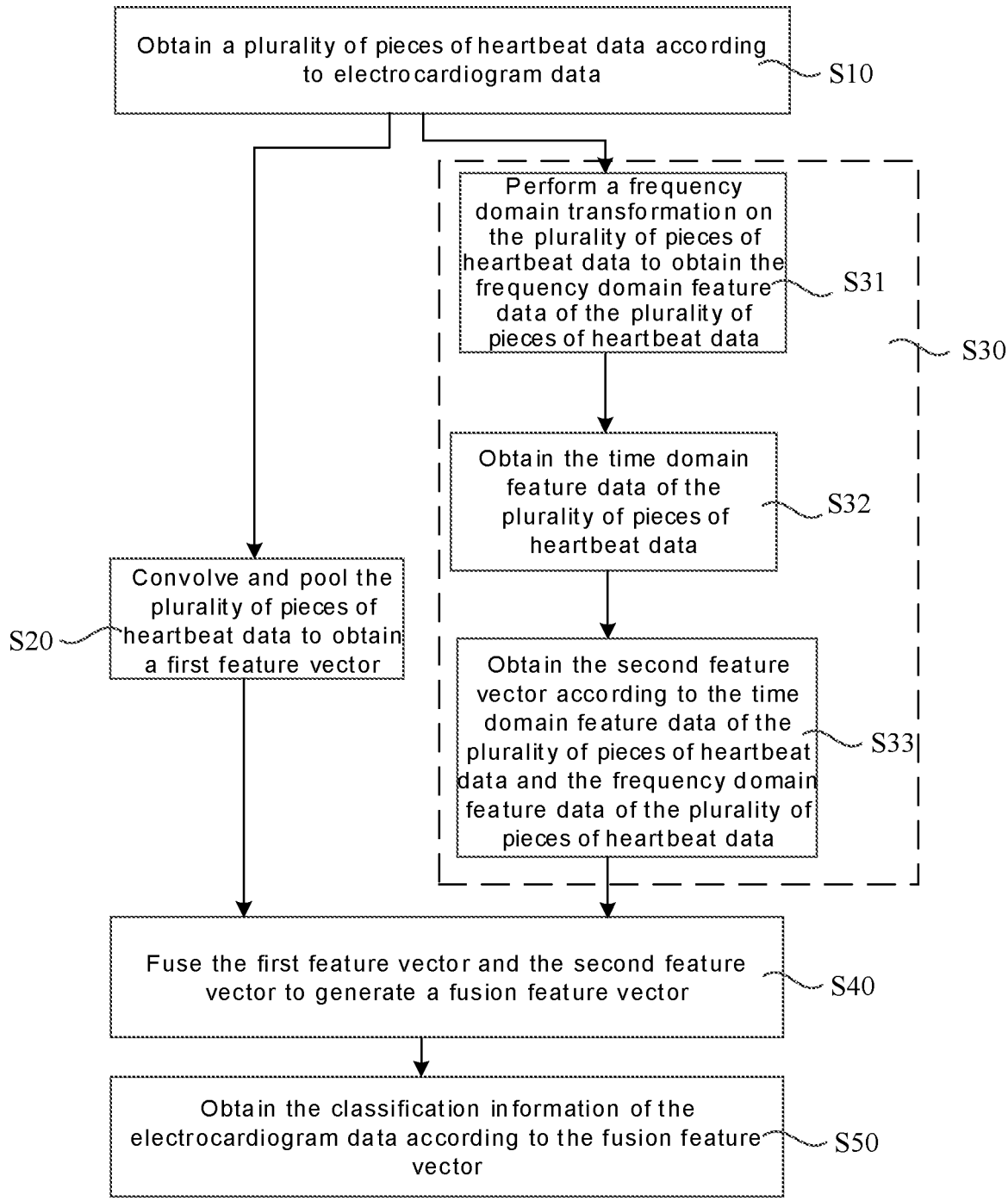
FIG. 3 is a flow diagram of another electrocardiogram data classification method, in accordance with some embodiments.

In some embodiments, as shown in FIG. 3, that the second feature vector is obtained, and the second feature vector represents the frequency domain feature data of the plurality of pieces of heartbeat data and the time domain feature data of the plurality of pieces of heartbeat data in S30 may include steps 31 to 33 (S31 to S33).

In S31, a frequency domain transformation is performed on the plurality of pieces of heartbeat data to obtain the frequency domain feature data of the plurality of pieces of heartbeat data.

Herein, the frequency domain transformation is performed on the plurality of pieces of heartbeat data, for example, a spectrogram is obtained by the short-time Fourier transform (STFT), and then transformed by a Mel filter bank to obtain a Mel spectrogram.

It will be understood that the frequency domain feature data of the heartbeat data may be obtained according to the Mel spectrogram, for example vertical axis information in the Mel spectrogram.

In S32, the time domain feature data of the plurality of pieces of heartbeat data is obtained. For example, the interval, the interval ratio, the interval mean, the amplitude, the width, etc. of the total of N pieces of heartbeat data before and after the current heartbeat data are collected.

In S33, the second feature vector is obtained according to the time domain feature data of the plurality of pieces of heartbeat data and the frequency domain feature data of the plurality of pieces of heartbeat data.

Figure 4:
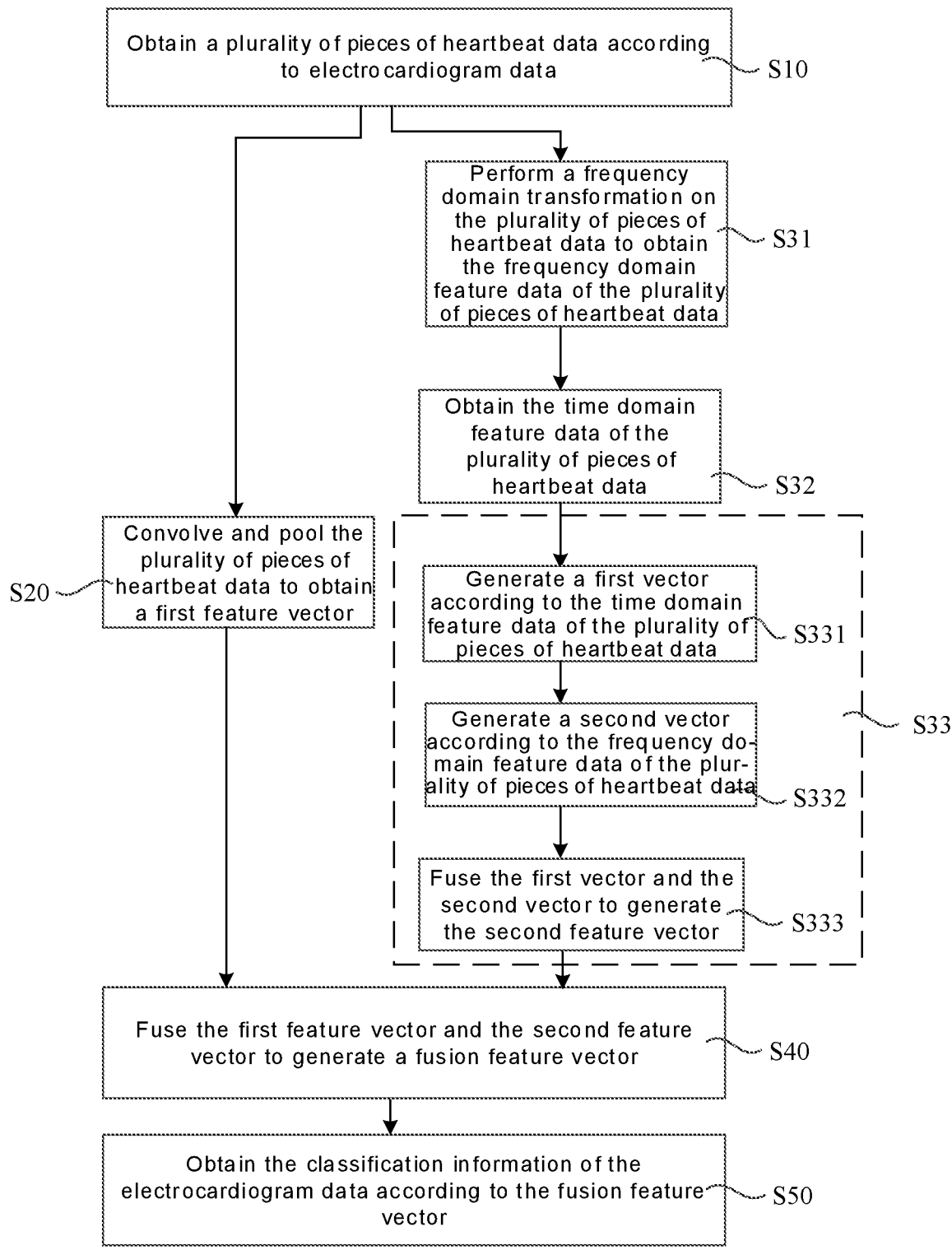
FIG. 4 is a flow diagram of yet another electrocardiogram data classification method, in accordance with some embodiments.

For example, as shown in FIG. 4, that the second feature vector is obtained according to the time domain feature data of the plurality of pieces of heartbeat data and the frequency domain feature data of the plurality of pieces of heartbeat data in S33 may include steps 331 to 333 (S331 to S333).

In S331, a first vector is generated according to the time domain feature data of the plurality of pieces of heartbeat data.

In S332, a second vector is generated according to the frequency domain feature data of the plurality of pieces of heartbeat data.

In S333, the first vector and the second vector are fused to generate the second feature vector.

The first vector and the second vector are fused to generate the second feature vector, for example, the first vector and the second vector may be fused in a splicing manner. Alternatively, the first vector and the second vector may be fused in other ways, which is not limited in embodiments of the present disclosure.

In this way, the second feature vector can not only represent the time domain feature data of the plurality of pieces of heartbeat data, but also represent the frequency domain feature data of the plurality of pieces of heartbeat data, so that when the second feature vector is used to classify the electrocardiogram data, it is beneficial to improve the accuracy of the classification information of the electrocardiogram data.

Figure 5:
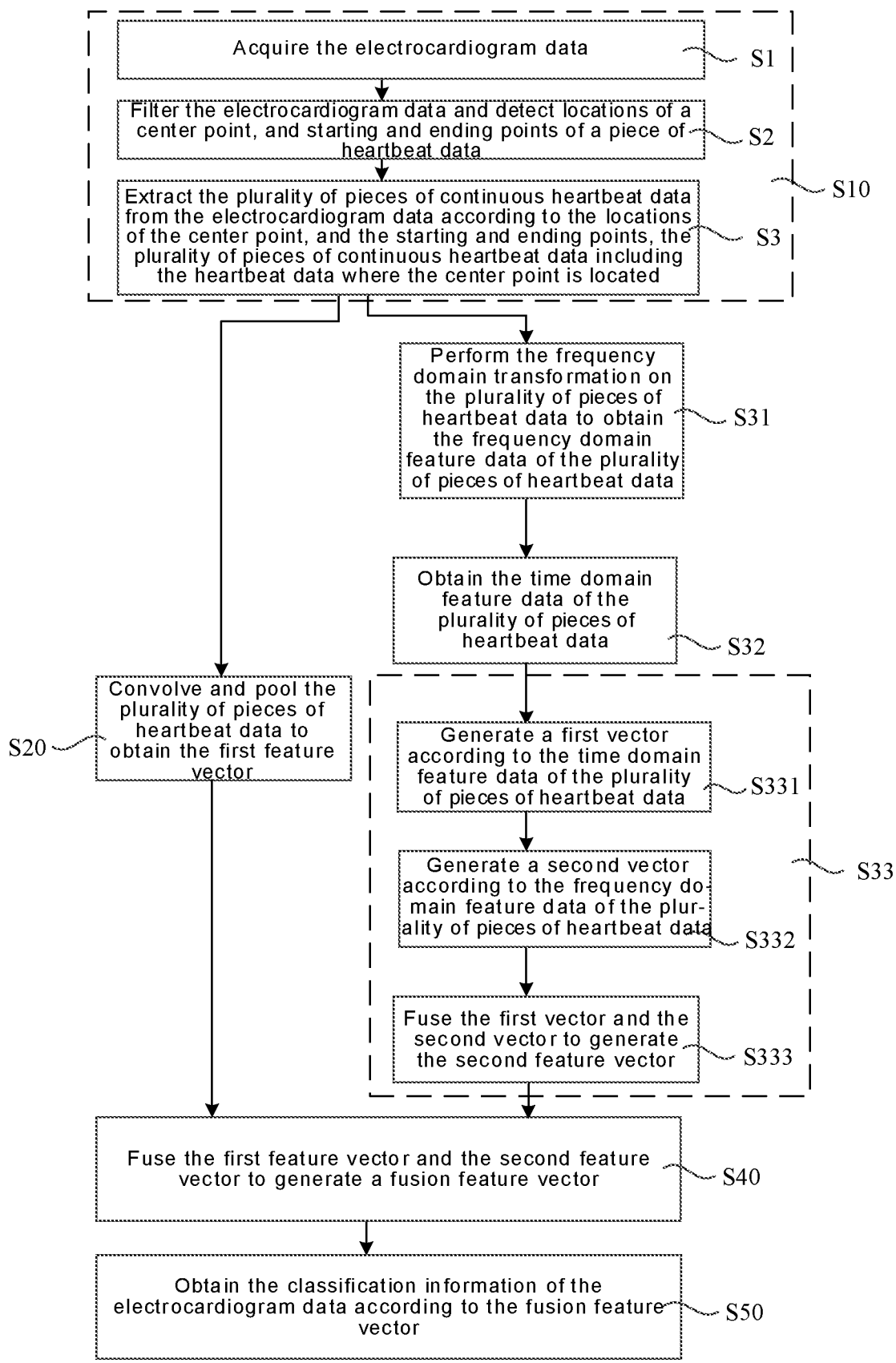
FIG. 5 is a flow diagram of yet another electrocardiogram data classification method, in accordance with some embodiments.

In some embodiments, as shown in FIG. 5, that the plurality of pieces of heartbeat data are obtained according to the electrocardiogram data in S10 may include steps 1 to 3 (S1 to S3).

In S1, the electrocardiogram data is acquired.

For example, the electrocardiogram data may be acquired by the electrocardiograph.

In S2, the electrocardiogram data is filtered, and locations of a center point, and starting and ending points of a piece of heartbeat data are detected.

In S3, a plurality of pieces of continuous heartbeat data are extracted from the electrocardiogram data according to the locations of the center point, and the starting and ending points, and the plurality of pieces of continuous heartbeat data include the heartbeat data where the center point is located.

Noise interference of the electrocardiogram data generally includes electromyographical interference, baseline drift and power frequency interference. The electromyographical interference is a millivolt-level potential generated by human muscle movement and muscle fibrillation. In general, the electromyographical interference may be removed by a bandpass filter. The baseline drift is interference caused by low-frequency noises such as electrode movement and human breathing, a frequency thereof is generally less than 5 Hz, and therefore, the baseline drift may be removed by a low-pass filter. The power frequency interference is interference generated by a public grid with a fixed frequency of 50 Hz or 60 Hz and various power consumption equipment, which may be eliminated by an adaptive filter to achieve good results.

Detecting the electrocardiogram data may be directly detecting the electrocardiogram data, or detecting the electrocardiogram data after filtering. A center point, and starting and ending points of a piece of heartbeat data may be detected and located by searching for a peak value of a waveform.

The plurality of pieces of continuous heartbeat data may be extracted from the electrocardiogram data according to the locations of the center point, and the starting and ending points, and the plurality of pieces of continuous heartbeat data include the heartbeat data where the center point is located. It will be noted herein that a center of the heartbeat data where the center point is located may coincide with a center of the plurality of pieces of heartbeat data, or the center of the heartbeat data where the center point is located may not coincide with a center of the plurality of pieces of continuous heartbeat data.

In some embodiments, each piece of heartbeat data may also be processed. For example, a peak location of an R wave in the heartbeat data is detected, and data in a first preset time period (which may be set according to needs, and is not limited in embodiments of the present disclosure, for example, the first preset time period is 0.2 seconds) from the peak location of the R wave to a direction of a P wave is intercepted from the heartbeat data, and a zero-padding operation is performed when there is no enough data length; and then, data in a second preset time period (which may be set according to needs, and is not limited in embodiments of the present disclosure, for example, the second preset time period is 0.5 seconds) from the peak location of the R wave to a direction of a T wave is intercepted from the heartbeat data, and similarly, the zero-padding operation is performed when there is no enough data length. The first preset time period and the second preset time period may be the same or different.

Figure 6:
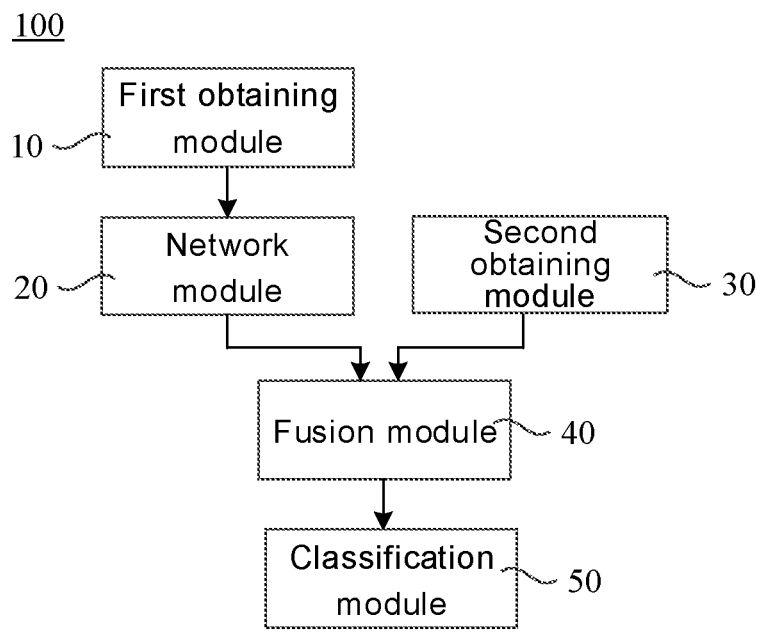
FIG. 6 is a structural diagram of an electrocardiogram data classification system, in accordance with some embodiments.

Some embodiments of the present disclosure further provide an electrocardiogram data classification system 100. As shown in FIG. 6, the system 100 includes:

a first obtaining module 10 configured to obtain a plurality of pieces of heartbeat data according to electrocardiogram data;

a network module 20 connected to the first obtaining module 10, the network module 20 being configured to convolve and pool the plurality of pieces of heartbeat data to obtain a first feature vector;

a second obtaining module 30 configured to obtain a second feature vector, the second feature vector representing frequency domain feature data of the plurality of pieces of heartbeat data and time domain feature data of the plurality of pieces of heartbeat data;

a fusion module 40 connected to both the network module 20 and the second obtaining module 30, and configured to fuse the first feature vector and the second feature vector to generate a fusion feature vector; and a classification module 50 connected to the fusion module 40, and configured to obtain classification information of the electrocardiogram data according to the fusion feature vector.

The electrocardiogram data classification system 100 provided by some embodiments of the present disclosure has the same beneficial effects as the electrocardiogram data classification method provided above, which will not be repeated herein.

Figure 7A:
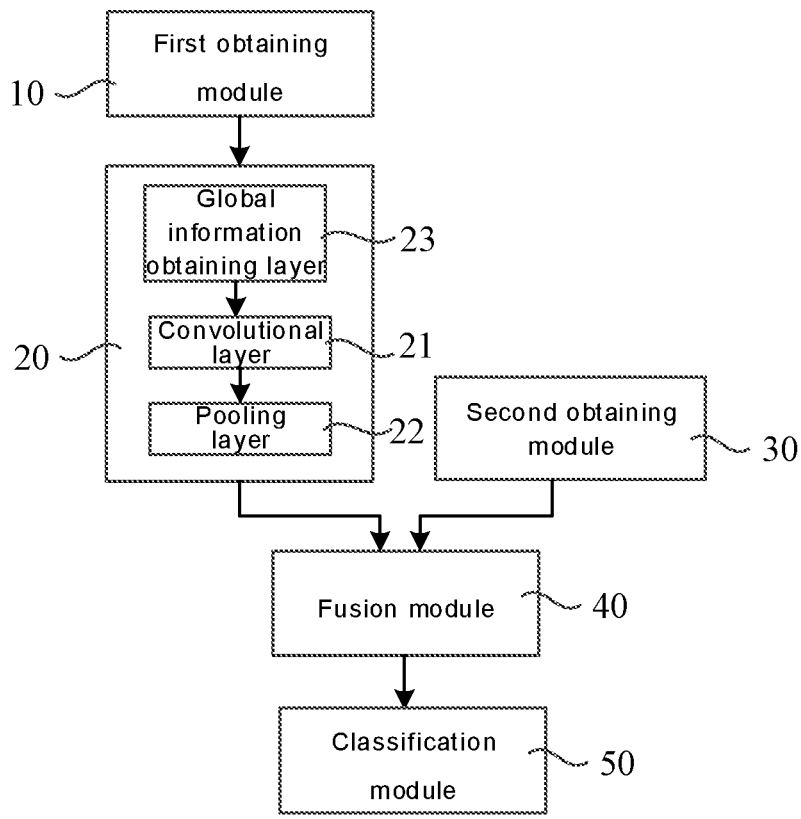
FIG. 7A is a structural diagram of another electrocardiogram data classification system, in accordance with some embodiments.
Figure 7B:
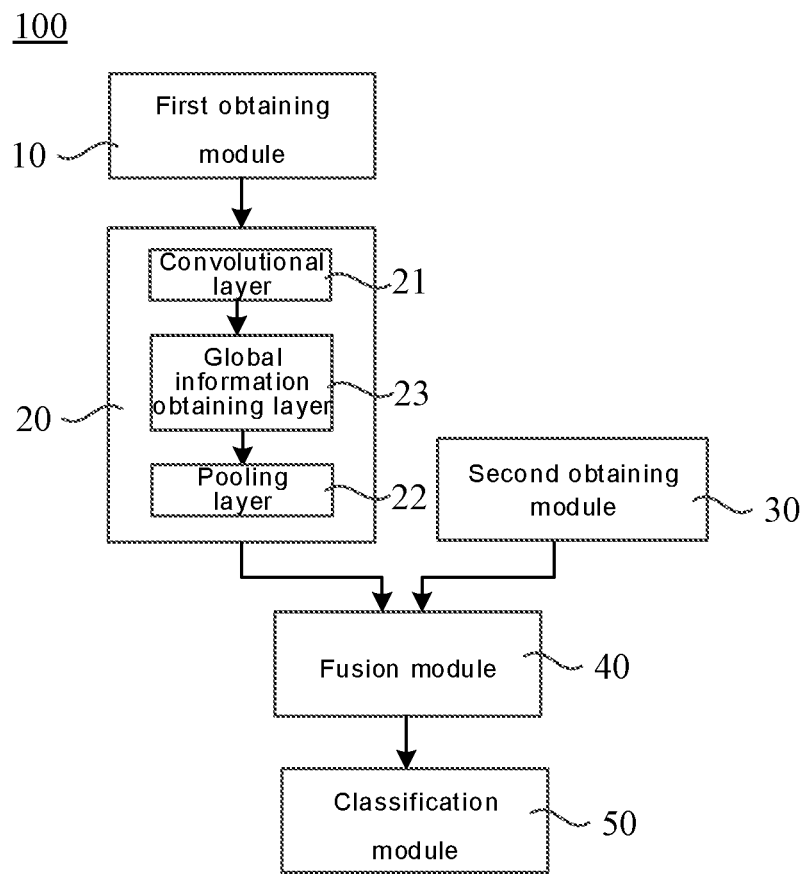
FIG. 7B is a structural diagram of yet another electrocardiogram data classification system, in accordance with some embodiments.
Figure 7C:
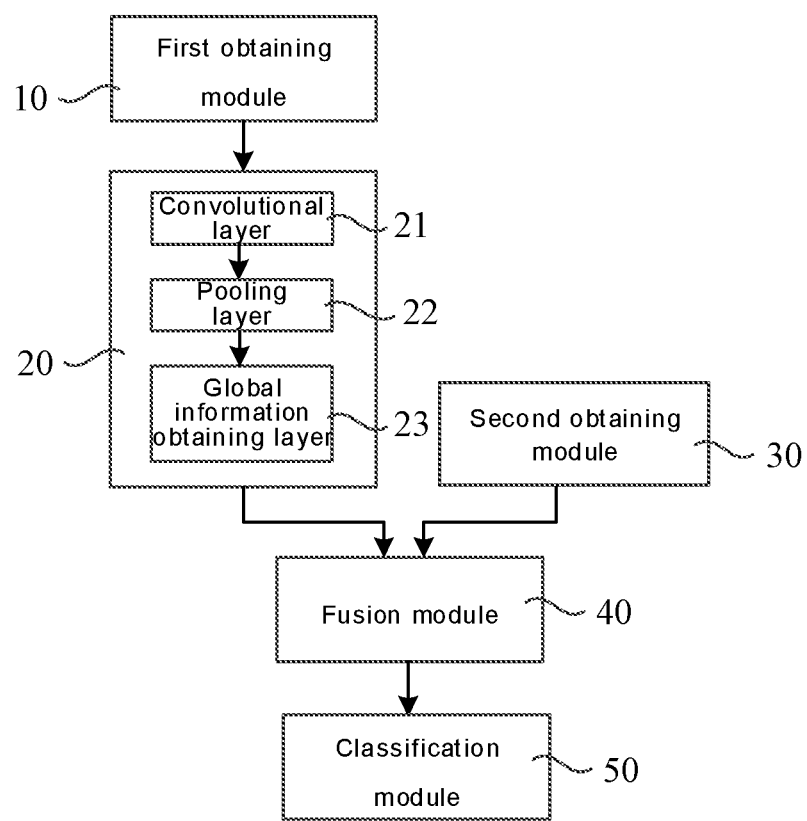
FIG. 7C is a structural diagram of yet another electrocardiogram data classification system, in accordance with some embodiments.

In some embodiments, as shown in FIGS. 7A to 7C, the network module 20 includes a convolutional layer 21 and a pooling layer 22. The convolutional layer 21 is configured to convolve the plurality of pieces of heartbeat data; and the pooling layer 22 is configured to pool the plurality of pieces of heartbeat data after convolution.

In some embodiments, as shown in FIGS. 7A to 7C, the network module 20 further includes a global information obtaining layer 23. The global information obtaining layer 23 is configured to process input data according to a preset condition.

The preset condition includes:

$$y_i = \frac{1}{C(x_i)} \sum_{\forall j} [f(x_i, x_j) g(x_j)], \ g(x_j) = W_g x_j,$$

$$f(x_i, x_j) = e^{(W_\theta x_i)^T (W_\phi x_j)}, \text{ and } C(x_i) = \sum_{\forall j} f(x_i, x_j);$$

x is the input data, y is output data corresponding to x, i is a location index of the output data, j is a location index of the input data, value ranges of i and j are both [1, M], and M is a data length; $y_i$ is output data at a location i, $x_i$ is input data corresponding to the output data at the location i, and $x_j$ is input data at a location j; $W_g$ is a first weight matrix, $W_\theta$ is a second weight matrix, and $W_\phi$ is a third weight matrix; $g(x_j)$ is a representation of the input data at the location j; $f(x_i, x_j)$ maps an association relationship between $x_i$ and $x_j$, and $C(x_i)$ is a normalization factor.

In a case where the global information obtaining layer 23 is located before the convolutional layer 21 and connected to the convolutional layer 21 (as shown in FIG. 7A), the input data is the plurality of pieces of heartbeat data. The output data is obtained after the input data is processed according to the preset condition, and the first feature vector may be obtained after the output data is convolved and pooled. In a case where the global information obtaining layer 23 is located between the convolutional layer 21 and the pooling layer 22 and connected to both the convolutional layer 21 and the pooling layer 22 (as shown in FIG. 7B), the input data is the plurality of pieces of heartbeat data after the convolution. The output data is obtained after the input data is processed according to the preset condition, and the first feature vector may be obtained after the output data is pooled. In a case where the global information obtaining layer 23 is located after the pooling layer 22 and connected to the pooling layer 22 (as shown in FIG. 7C), the input data is the plurality of pieces of heartbeat data after the pooling. The output data is obtained after the input data is processed according to the preset condition, and the output data may be the first feature vector.

Figure 8:
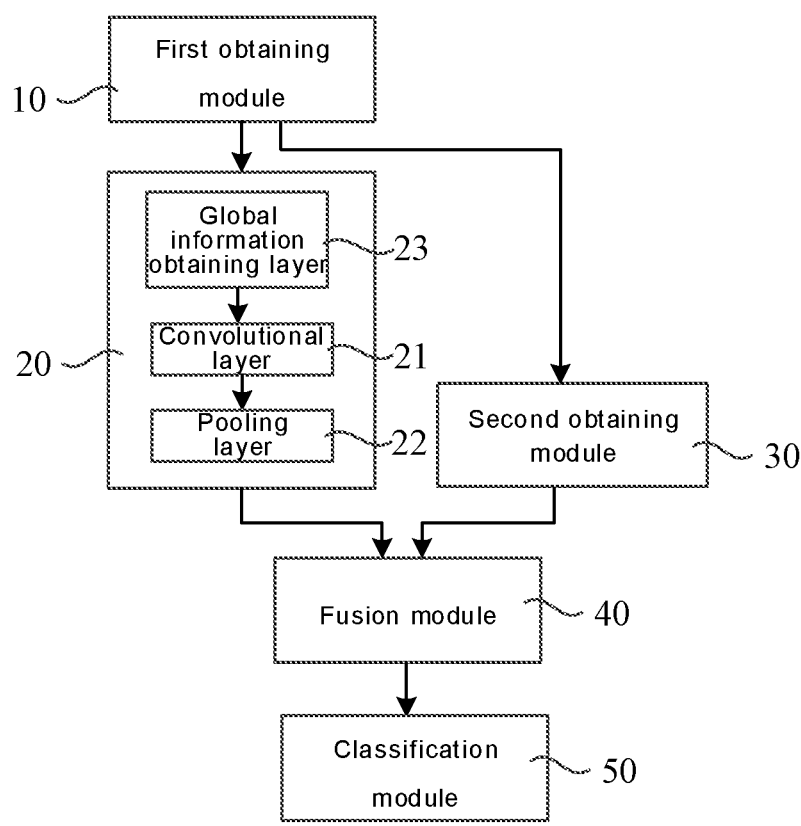
FIG. 8 is a structural diagram of yet another electrocardiogram data classification system, in accordance with some embodiments.

In some embodiments, as shown in FIG. 8, the second obtaining module 30 is connected to the first obtaining module 10, and the second obtaining module 30 is configured to: perform a frequency domain transformation on the plurality of pieces of heartbeat data to obtain the frequency domain feature data of the plurality of pieces of heartbeat data; obtain the time domain feature data of the plurality of pieces of heartbeat data; and obtain the second feature vector according to the time domain feature data of the plurality of pieces of heartbeat data and the frequency domain feature data of the plurality of pieces of heartbeat data.

Figure 9:
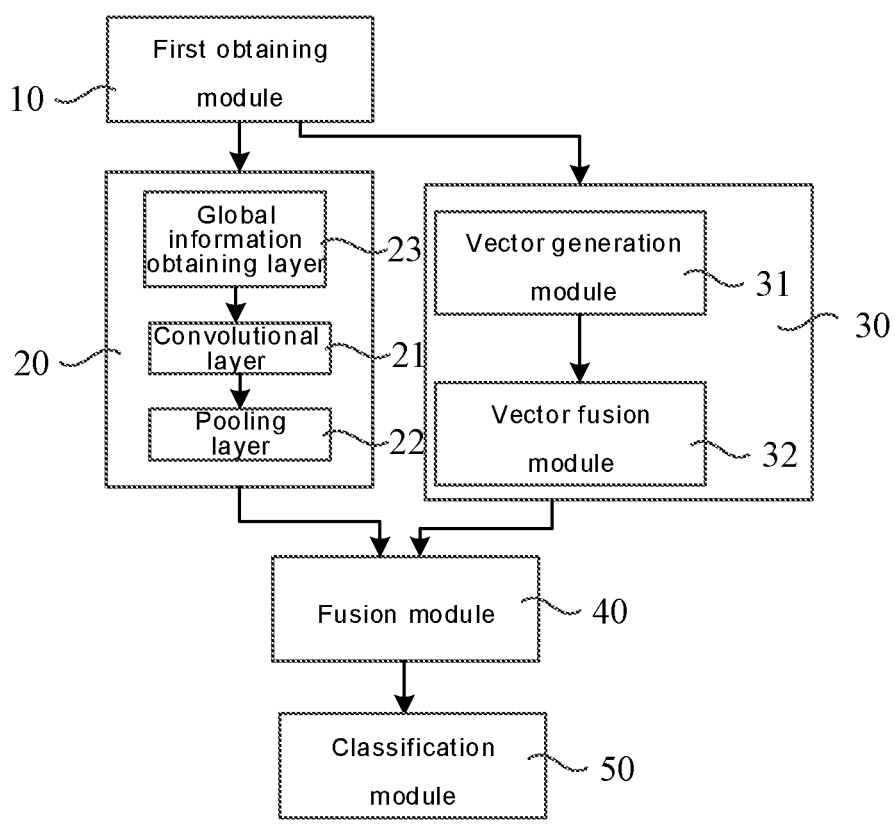
FIG. 9 is a structural diagram of yet another electrocardiogram data classification system, in accordance with some embodiments.

In some embodiments, as shown in FIG. 9, the second obtaining module 30 includes a vector generation module 31 and a vector fusion module 32. The vector generation module 31 is configured to generate a first vector according to the time domain feature data of the plurality of pieces of heartbeat data, and generate a second vector according to the frequency domain feature data of the plurality of pieces of heartbeat data. The vector fusion module 32 is configured to fuse the first vector and the second vector to generate the second feature vector.

In some embodiments, the fusion module 40 is configured to fuse the first feature vector and the second feature vector using $F_j=[(W_{EL}F_E) \times F_L, (W_{LE}F_L) \times F_E]$ to generate the fusion feature vector.

Here, $F_L$ is the first feature vector, $F_E$ is the second feature vector, $F_j$ is the fusion feature vector, $W_{EL}$ is a fourth weight matrix, and $W_{LE}$ is a fifth weight matrix.

Based on this, the network module 20, the fusion module 40, and the classification module 50 may jointly construct an end-to-end network model P, including two input terminals and one output terminal. One input terminal inputs the plurality of pieces of heartbeat data and the other input terminal inputs the second feature vector, and the output terminal outputs the classification information.

Figure 10:
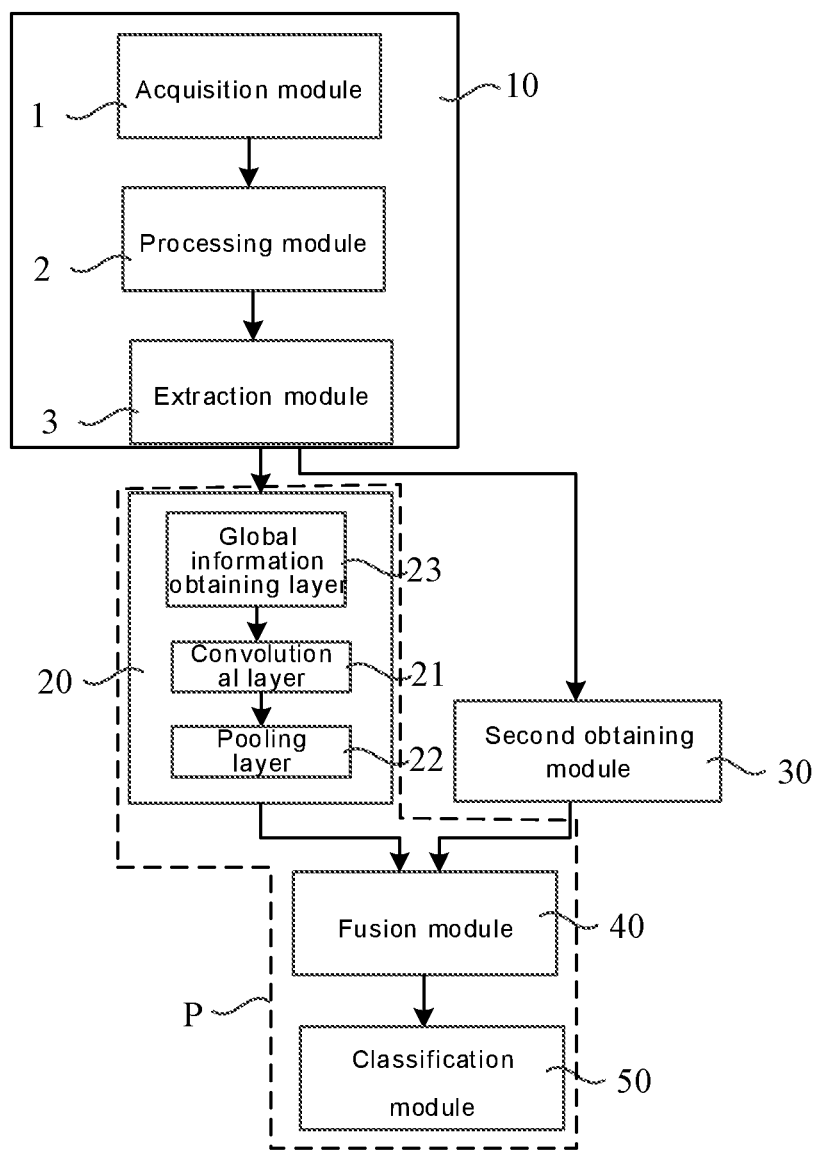
FIG. 10 is a structural diagram of yet another electrocardiogram data classification system, in accordance with some embodiments.

As shown in FIG. 10, the network model P includes the convolutional layer 21, the pooling layer 22, the global information obtaining layer 23, a fusion layer (i.e., the fusion module 40), and a fully connected layer (i.e., the classification module 50).

Based on this, the network model P further includes a temporary dropout layer and an activation function layer. Of course, the network model is not limited to the above structure, and its specific internal structure may be set according to needs, which is not limited in embodiments of the present disclosure.

In some embodiments, as shown in FIG. 10, the first obtaining module 10 further includes:

an acquisition module 1 configured to acquire the electrocardiogram data;

a processing module 2 connected to the acquisition module 1, and configured to filter the electrocardiogram data and detect locations of a center point, and starting and ending points of a piece of heartbeat data; and an extraction module 3 connected to the processing module 2, the extraction module 3 being configured to extract a plurality of pieces of continuous heartbeat data from the electrocardiogram data according to the locations of the center point, and the starting and ending points, the plurality of pieces of continuous heartbeat data including the heartbeat data where the center point is located.

Some embodiments of the present disclosure provide a computer device including a memory and a processor; the memory has stored thereon a computer program that is executable on the processor; and the processor executes the computer program to cause the computer device to implement the electrocardiogram data classification method as described above.

Some embodiments of the present disclosure provide a non-transitory computer-readable storage medium having stored a computer program thereon. When the computer program is executed by a processor, the electrocardiogram data classification method as described above is implemented.

For example, the computer-readable storage medium may include, but are not limited to, a magnetic storage device (e.g., a hard disk, a floppy disk or a magnetic tape), an optical disk (e.g., a compact disk (CD), and a digital versatile disk (DVD)), a smart card and a flash memory device (e.g., an erasable programmable read-only memory (EPROM), a card, a stick or a key driver). Various computer-readable storage media described in embodiments of the present disclosure may represent one or more devices and/or other machine-readable storage media that are used to store information. The term "machine-readable storage media" may include, but are not limited to, wireless channels and other various media capable of storing, containing and/or carrying instructions and/or data.

Some embodiments of the present disclosure provide a computer program product. The computer program product includes computer program instructions. When executed on a computer, the computer program instructions cause the computer to perform one or more steps in the electrocardiogram data classification method as described in the above embodiments.

Some embodiments of the present disclosure provide a computer program. When executed on a computer, the computer program causes the computer to perform one or more steps in the electrocardiogram data classification method as described in the above embodiments.

The computer device, the computer-readable storage medium, the computer program product and the computer program have the same beneficial effects as the electrocardiogram data classification method as described in some of the above embodiments, which will be not described herein again.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An electrocardiogram data classification method, comprising:

obtaining a plurality of pieces of heartbeat data according to electrocardiogram data;

convolving and pooling the plurality of pieces of heartbeat data to obtain a first feature vector based on a convolutional neural network;

obtaining a second feature vector, the second feature vector representing frequency domain feature data of the plurality of pieces of heartbeat data and time domain feature data of the plurality of pieces of heartbeat data;

fusing the first feature vector and the second feature vector to generate a fusion feature vector; and using a support vector machine (SVM) or a multilayer perceptron (MLP) and adopting a machine learning method to classify the fusion feature vector to obtain classification information of the electrocardiogram data;

the electrocardiogram data classification method further comprising: processing input data according to a preset condition; wherein the preset condition includes:

$$y_i = \frac{1}{C(x_i)} \sum_{\forall j} [f(x_i, x_j) g(x_j)], g(x_j) = W_g x_j,$$

$$f(x_i, x_j) = e^{(W_\theta x_i)^T (W_\phi x_j)}, \text{ and } C(x_i) = \sum_{\forall j} f(x_i, x_j);$$

wherein x is the input data, y is output data corresponding to x, i is a location index of the output data, j is a location index of the input data, value ranges of i and j are both [1, M], and M is a data length; $y_i$ is output data at a location i, $x_i$ is input data corresponding to the output data at the location i, and $x_j$ is input data at a location j; $W_\theta$ is a first weight matrix, $W_\theta$ is a second weight matrix, and $W_\phi$ is a third weight matrix; $g(X_j)$ is a representation of the input data at the location j; $f(X_i, X_j)$ maps an association relationship between $x_i$ and $x_j$; and $C(X_i)$ is a normalization factor; and the input data is the plurality of pieces of heartbeat data, or the input data is the plurality of pieces of heartbeat data after convolution, or, the input data is the plurality of pieces of heartbeat data after pooling.

2. The electrocardiogram data classification method according to claim 1, wherein obtaining the second feature vector includes:

performing a frequency domain transformation on the plurality of pieces of heartbeat data to obtain the frequency domain feature data of the plurality of pieces of heartbeat data;

obtaining the time domain feature data of the plurality of pieces of heartbeat data; and obtaining the second feature vector according to the time domain feature data of the plurality of pieces of heartbeat data and the frequency domain feature data of the plurality of pieces of heartbeat data.

3. The electrocardiogram data classification method according to claim 2, wherein obtaining the second feature vector according to the time domain feature data of the plurality of pieces of heartbeat data and the frequency domain feature data of the plurality of pieces of heartbeat data includes:

generating a first vector according to the time domain feature data of the plurality of pieces of heartbeat data;

generating a second vector according to the frequency domain feature data of the plurality of pieces of heartbeat data; and fusing the first vector and the second vector to generate the second feature vector.

4. The electrocardiogram data classification method according to claim 1, wherein fusing the first feature vector and the second feature vector to generate the fusion feature vector includes:

fusing the first feature vector and the second feature vector using $F_f=[(W_{EL}F_E) \times F_L, (W_{LE}F_L) \times F_E]$ to generate the fusion feature vector;

wherein $F_L$ is the first feature vector, $F_E$ is the second feature vector, $F_f$ is the fusion feature vector, $W_{EL}$ is a fourth weight matrix, and $W_{LE}$ is a fifth weight matrix.

5. The electrocardiogram data classification method according to claim 1, wherein obtaining the plurality of pieces of heartbeat data according to the electrocardiogram data includes:

acquiring the electrocardiogram data;

filtering the electrocardiogram data;

detecting locations of a center point, and starting and ending points of a piece of heartbeat data; and extracting a plurality of pieces of continuous heartbeat data from the electrocardiogram data according to the locations of the center point, and the starting and ending points, the plurality of pieces of continuous heartbeat data including the heartbeat data where the center point is located and serving as the plurality of pieces of heartbeat data.

6. A computer device, comprising a memory and a processor; wherein the memory has stored thereon a computer program that is executable on the processor, and when the processor executes the computer program, an electrocardiogram data classification method is implemented including:

obtaining a plurality of pieces of heartbeat data according to electrocardiogram data;

convolving and pooling the plurality of pieces of heartbeat data to obtain a first feature vector based on a convolutional neural network;

obtaining a second feature vector, the second feature vector representing frequency domain feature data of the plurality of pieces of heartbeat data and time domain feature data of the plurality of pieces of heartbeat data;

fusing the first feature vector and the second feature vector to generate a fusion feature vector; and using a support vector machine (SVM) or a multilayer perceptron (MLP) and adopting a machine learning method to classify the fusion feature vector to obtain classification information of the electrocardiogram data;

when the processor executes the computer program, the electrocardiogram data classification method is implemented further including: processing input data according to a preset condition: wherein the preset condition includes:

$$y_i = \frac{1}{C(x_i)} \sum_{\forall j} [f(x_i, x_j) g(x_j)], g(x_j) = W_g x_j,$$

$$f(x_i, x_j) = e^{(W_\theta x_i)^T (W_\phi x_j)}, \text{ and } C(x_i) = \sum_{\forall j} f(x_i, x_j);$$

wherein x is the input data, y is output data corresponding to x, i is a location index of the output data, j is a location index of the input data, value ranges of i and j are both [1, M], and M is a data length; $y_i$ is output data at a location i, $x_i$ is input data corresponding to the output data at the location i, and $x_j$ is input data at a location j; $W_g$ is a first weight matrix, $W_\theta$ is a second weight matrix, and $W_\phi$ is a third weight matrix; $g(X_j)$ is a representation of the input data at the location j; $f(X_i, X_j)$ maps an association relationship between $x_i$ and $x_j$; and $C(x_i)$ is a normalization factor; and the input data is the plurality of pieces of heartbeat data, or the input data is the plurality of pieces of heartbeat data after convolution, or, the input data is the plurality of pieces of heartbeat data after pooling.

7. The computer device according to claim 6, wherein obtaining the second feature vector includes:

performing a frequency domain transformation on the plurality of pieces of heartbeat data to obtain the frequency domain feature data of the plurality of pieces of heartbeat data;

obtaining the time domain feature data of the plurality of pieces of heartbeat data; and obtaining the second feature vector according to the time domain feature data of the plurality of pieces of heartbeat data and the frequency domain feature data of the plurality of pieces of heartbeat data.

8. The computer device according to claim 7, wherein obtaining the second feature vector according to the time domain feature data of the plurality of pieces of heartbeat data and the frequency domain feature data of the plurality of pieces of heartbeat data includes:

generating a first vector according to the time domain feature data of the plurality of pieces of heartbeat data;

generating a second vector according to the frequency domain feature data of the plurality of pieces of heartbeat data; and fusing the first vector and the second vector to generate the second feature vector.

9. The computer device according to claim 6, wherein fusing the first feature vector and the second feature vector to generate the fusion feature vector includes:

fusing the first feature vector and the second feature vector using $F_f=[W_{EL}F_E) \times F_L, (W_{LE}F_L) \times F_E]$ to generate the fusion feature vector;

wherein $F_L$ is the first feature vector, $F_E$ is the second feature vector, $F_f$ is the fusion feature vector, $W_{EL}$ is a fourth weight matrix, and $W_{LE}$ is a fifth weight matrix.

10. The computer device according to claim 6, wherein obtaining the plurality of pieces of heartbeat data according to the electrocardiogram data includes:

acquiring the electrocardiogram data;

filtering the electrocardiogram data;

detecting locations of a center point, and starting and ending points of a piece of heartbeat data; and extracting a plurality of pieces of continuous heartbeat data from the electrocardiogram data according to the locations of the center point, and the starting and ending points, the plurality of pieces of continuous heartbeat data including the heartbeat data where the center point is located and serving as the plurality of pieces of heartbeat data.

11. An electrocardiogram data classification method, comprising:

obtaining a plurality of pieces of heartbeat data according to electrocardiogram data;

convolving and pooling the plurality of pieces of heartbeat data to obtain a first feature vector based on a convolutional neural network;

obtaining a second feature vector, the second feature vector representing frequency domain feature data of the plurality of pieces of heartbeat data and time domain feature data of the plurality of pieces of heartbeat data;

fusing the first feature vector and the second feature vector to generate a fusion feature vector; and using a support vector machine (SVM) or a multilayer perceptron (MLP) and adopting a machine learning method to classify the fusion feature vector to obtain classification information of the electrocardiogram data;

wherein fusing the first feature vector and the second feature vector to generate the fusion feature vector includes:

fusing the first feature vector and the second feature vector using $F^f=[(W_{EL}F_E) \times F_L, (W_{LE}F_L) \times F_E]$ to generate the fusion feature vector; wherein $F_L$ is the first feature vector, $F_E$ is the second feature vector, $F_f$ is the fusion feature vector, $W_{EL}$ is a fourth weight matrix, and $W_{LE}$ is a fifth weight matrix.

12. A non-transitory computer-readable storage medium having stored a computer program thereon, wherein when the computer program is executed by a processor, the electrocardiogram data classification method according to claim 1 is implemented.

* * * * *